US009015203B2

(12) United States Patent
Corrie (10) Patent No.: US 9,015,203 B2
(45) Date of Patent: Apr. 21, 2015

(54) BALLOON OBJECT FEEDBACK FOR JAVA VIRTUAL MACHINES

(75) Inventor: Benjamin J. Corrie, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 146 days.

(21) Appl. No.: 13/485,278

(22) Filed: May 31, 2012

(65) Prior Publication Data

US 2013/0325912 A1 Dec. 5, 2013

(51) Int. Cl.
*G06F 17/30* (2006.01)
*G06F 9/455* (2006.01)
*G06F 12/02* (2006.01)
*G06F 12/08* (2006.01)

(52) U.S. Cl.
CPC ........ *G06F 12/0253* (2013.01); *G06F 12/0875* (2013.01)

(58) Field of Classification Search
CPC .................................................. G06F 12/0253
See application file for complete search history.

(56) References Cited

U.S. PATENT DOCUMENTS

| | | | |
|---|---|---|---|
| 5,493,663 A | 2/1996 | Parikh | |
| 5,606,685 A | 2/1997 | Frandeen | |
| 6,202,127 B1 | 3/2001 | Dean et al. | |
| 6,496,912 B1 | 12/2002 | Fields, Jr. et al. | |
| 6,789,156 B1 | 9/2004 | Waldspurger | |
| 7,412,492 B1 | 8/2008 | Waldspurger | |
| 7,421,533 B2 | 9/2008 | Zimmer et al. | |
| 7,433,951 B1 | 10/2008 | Waldspurger | |
| 7,472,252 B2 | 12/2008 | Ben-Zvi | |
| 7,500,048 B1 | 3/2009 | Venkitachalam et al. | |
| 7,640,543 B2 | 12/2009 | Vij et al. | |
| 7,702,843 B1 | 4/2010 | Chen et al. | |
| 7,716,446 B1 | 5/2010 | Chen et al. | |
| 7,797,699 B2 | 9/2010 | Kagi et al. | |
| 7,870,153 B2 | 1/2011 | Croft et al. | |
| 7,886,126 B2 | 2/2011 | Bennett et al. | |
| 8,095,931 B1 | 1/2012 | Chen et al. | |
| 8,156,492 B2* | 4/2012 | Dahlstedt | 718/1 |
| 8,359,451 B2 | 1/2013 | Chen et al. | |
| 8,543,790 B2 | 9/2013 | Chen et al. | |
| 8,583,875 B1 | 11/2013 | Garthwaite et al. | |
| 2001/0044856 A1* | 11/2001 | Agesen et al. | 709/315 |
| 2002/0019716 A1* | 2/2002 | Agesen et al. | 702/83 |
| 2003/0212719 A1* | 11/2003 | Yasuda et al. | 707/206 |
| 2005/0232192 A1 | 10/2005 | Rawson | |
| 2005/0262505 A1 | 11/2005 | Esfahany et al. | |
| 2006/0004944 A1 | 1/2006 | Vij et al. | |

(Continued)

OTHER PUBLICATIONS

Heo et al., Memory overbooking and dynamic control of Xen virtual Machines consolidated environments, ASPOLOS RESOLVE-Workshop on Runtime Environments/Systems, Layering and Virtualized Environments, 2011 (8 pages).

(Continued)

*Primary Examiner* — Tarek Chbouki (57) ABSTRACT

A mechanism is provided for managing balloon objects of a memory balloon for a runtime environment executing in a virtual machine. The mechanism includes a balloon agent that evaluates a relative value of each balloon object. The balloon agent may set an allocation rate of rebuilding balloon objects based on life spans of previously garbage-collected balloon objects. The balloon agent may also modify a percentage of balloon objects to be weak-referenced based on an amount of application data freed in a previous garbage collection.

24 Claims, 5 Drawing Sheets

(56) References Cited

U.S. PATENT DOCUMENTS

| | | | |
|---|---|---|---|
| 2006/0064697 A1 | 3/2006 | Kagi et al. | |
| 2006/0161719 A1 | 7/2006 | Bennett et al. | |
| 2007/0038837 A1 | 2/2007 | Ben-Zvi | |
| 2007/0136402 A1 | 6/2007 | Grose et al. | |
| 2007/0192329 A1 | 8/2007 | Croft et al. | |
| 2009/0070776 A1* | 3/2009 | Dahlstedt | 719/312 |
| 2010/0211754 A1* | 8/2010 | Crosby et al. | 711/170 |
| 2010/0241785 A1 | 9/2010 | Chen et al. | |
| 2011/0320682 A1 | 12/2011 | McDougall et al. | |
| 2012/0110577 A1 | 5/2012 | Chen et al. | |
| 2012/0185854 A1* | 7/2012 | Dahlstedt | 718/1 |
| 2012/0233435 A1* | 9/2012 | Ben-Yehuda et al. | 711/170 |
| 2013/0132957 A1 | 5/2013 | Chen et al. | |
| 2013/0218644 A1* | 8/2013 | Kasravi et al. | 705/7.39 |
| 2013/0290382 A1* | 10/2013 | Adachi et al. | 707/813 |
| 2013/0290596 A1 | 10/2013 | Corrie | |

OTHER PUBLICATIONS

Schwidefsky et al., Collaborative Memory Management in Hosted Linux Environments:, Proceedings of the Linux Symposium, vol. 2, pp. 313-328,206.

Tauber, "Automation and Optimization in IT-DB Oracle VM virtualization Systems", CERN openlab, Aug. 20, 2010.

C.A. Waldspurger, "Memory Resource Management in VMWare ESX Server" Proceedings of the 5th Symposium on Operating Systems Design and Implementation (OSDI 2002), AMC Operating Systems Review, pp. 1-14, Dec. 2002.

Gordon et al., "Ginkgo Automated, Application-Driven Memory Overcommitment for Could Computing", ASPOLOS RESOLVE-Workshop on Runtime Environments/Systems, Layering and Virtualized Environments, 2011.

* cited by examiner

BALLOON OBJECT FEEDBACK FOR JAVA VIRTUAL MACHINES

BACKGROUND

Virtual computing environments allow multiple virtual machines (VMs) to run on a single physical platform (also referred to herein as a "host") and to share physical resources. Some virtual computing environments enable configuration of VMs such that the total amount of memory designated for use by the VMs is larger than the actual amount of memory available on the host. Referred to as memory over-commitment, this feature enables the host to support the simultaneous execution of more VMs. To achieve over-commitment, the virtual computing environment simply gives a VM less memory than what the guest operating system (OS) in the VM believes it has.

Memory over-commitment is traditionally enabled using a technique known as ballooning, which is described in U.S. Pat. No. 7,433,951, the entire contents of which are incorporated by reference herein. A balloon is a resource reservation application that runs as a guest application in the VM or as driver in the guest OS that requests guest physical memory from the guest OS. After the guest OS has allocated guest physical memory for use by the balloon application, the balloon application is able to ultimately communicate information regarding the allocated guest physical memory to a hypervisor that supports the VM, which is then able to repurpose the host's system memory (also referred to herein as "machine memory") backing the guest physical memory allocated to the balloon application. That is, since the balloon application only reserves guest physical memory but does not actually use it, the hypervisor can, for example, repurpose machine memory that backs such allocated guest physical memory for use by another VM without fear that the balloon application would write to the guest physical memory (and therefore the backed machine memory).

Another technique for memory management that is useful under memory over-commitment situations is referred to as page sharing. In this technique, the hypervisor identifies and eliminates redundant copies of guest physical memory pages across VMs by mapping the identical guest physical pages to the same machine memory page and enabling copy-on-write for that machine memory page. This technique enables sharing of memory between VMs in cases where VMs may be running instances of the same guest OS, applications, and libraries, and have other data in common.

Unfortunately, there are applications and runtime environments that do not work well with conventional memory over-commitment in virtual computing environments. Java Virtual Machine (JVM) is one of the most widely used runtime environments in this category. JVMs typically have their own memory management mechanisms. Allocated Java objects sit in a JVM heap until the JVM runs out of heap space, and in this event, garbage collection sweeps the heap and recycles dead objects, which are unreachable from the program. A memory-managed JVM runtime can be a problematic candidate for memory over-commitment in a virtual computing environment because freed memory made available by garbage collection is typically held exclusively for use by the runtime and therefore cannot be used by other applications running in the virtual computing environment. In addition, attempts to over-commit the memory may result in lack of memory to support the JVM heap, causing a significant performance hit on the JVM runtime.

Recent advances in memory-managed JVM runtimes have used a ballooning-type mechanism incorporated into the JVM runtime. To "inflate" the JVM balloon, objects are inserted into heap memory reserved for the JVM runtime and the JVM runtime's own memory management techniques, such as garbage collection, are relied upon to free and clear up available memory space. However, if the JVM runtime is unable to give up enough memory to satisfy memory demands from a hypervisor, such as in scenarios where a Java application is actively using much of the heap memory assigned to the JVM, then the hypervisor has to resort to host swapping of memory pages to disk, thereby incurring a heavy cost in performance and efficiency.

SUMMARY

One or more embodiments of the present disclosure provide methods, systems, and computer programs for managing memory in a host computer system in which virtual machines (VMs) execute. In one embodiment, a balloon agent that is part of a runtime environment (e.g., JVM) is configured to assign a value of importance to each balloon object within a heap memory of the runtime environment and maintain the balloon objects within the heap memory such that the overall "cost" of keeping the balloon objects within the heap memory balloon is reduced. The balloon agent actively manages the balloon objects with a form of "balloon erosion" that uses different levels of object reference strength based on metrics derived from garbage collections within the heap memory, such that a balloon object having a lesser value of importance is given a lower relative object reference strength.

A method for managing memory of a runtime environment executing on a virtual machine, according to one embodiment, includes the steps of allocating a plurality of balloon objects within heap memory of a runtime environment in response to a request for memory, detecting a garbage collection process, and determining an amount of heap memory freed by the garbage collection process and previously occupied by unused objects. The steps further include marking a portion of the plurality of balloon objects as available for garbage collection according to the determined amount of heap memory freed by the garbage collection process and previously occupied by the unused objects. One or more of the balloon objects that are marked are freed in a next garbage collection process.

A method for managing memory of a runtime environment executing on a virtual machine, according to one embodiment, includes the steps of detecting a garbage collection process configured to free unused objects and weak-referenced balloon objects residing within the heap memory, and receiving a target memory reclamation size in conjunction with a request for memory. The steps further include identifying a plurality of balloon objects that were freed in the detected garbage collection process, determining an allocation rate of new balloon objects based on life spans of the identified balloon objects within the heap memory, and allocating a plurality of the new balloon objects at the determined allocation rate up to the target memory reclamation size.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
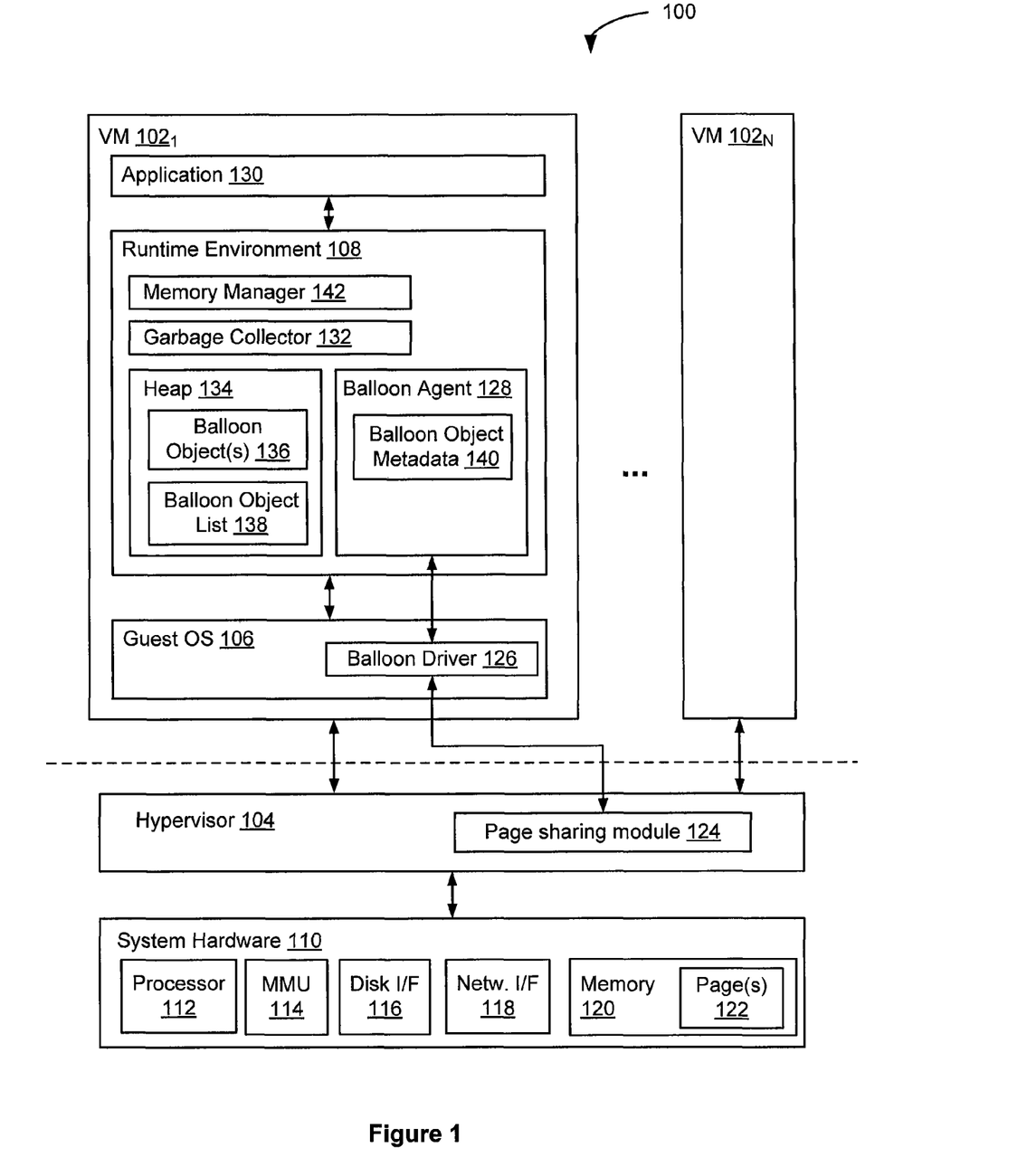
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. Computer system 100 (also referred to as a "server" or "host") is configured to support a virtualized environment comprised of one or more virtual machines.

As in conventional computer systems, computer system 100 includes both system hardware 110 and system software. System hardware 110 generally includes a processor 112, some form of memory management unit (MMU) 114 (which may be integrated with processor 112), a disk interface 116, a network interface 118, and memory 120 (referred to herein as "machine memory"). Machine memory 120 stores data and software such as an operating system and currently running application programs. Generally, MMU 114 is responsible for managing a virtual memory for processes running in computer system 100 by mapping virtual memory pages to machine memory pages. MMU 114 typically divides virtual memory address space and machine memory address space into blocks of contiguous memory addresses referred to as memory pages 122. Processor 112 may be a single processor, or two or more cooperating processors in a known multiprocessor arrangement. Examples of disk interface 116 are a host bus adapter and a network file system interface. An example of network interface 118 is a network adapter, also referred to as a network interface controller (NIC). In some embodiments, a plurality of NICs is included as network interface 118. It should further be recognized that system hardware 110 also includes, or is connected to, conventional registers, interrupt handling circuitry, a clock, etc., which, for the sake of simplicity, are not shown in the figures.

One or more virtual machines (VMs), represented by VM $102_1$ to VM $102_N$, are configured within computer system 100 and share the hardware resources of computer system 100. Each virtual machine typically includes a guest operating system (OS) 106 and virtualized system hardware (not shown), which includes one or more virtual CPUs, virtual system memory, one or more virtual disks, one or more virtual devices, etc., all of which are implemented in software to emulate the corresponding components of an actual computer.

The virtual machines run on top of a hypervisor 104 (sometimes referred to as a virtual machine monitor, or VMM), which is a software interface layer that abstracts system hardware 110 into virtualized hardware, thereby enabling sharing of system hardware 110 of computer system 100 amongst the virtual machines. Hypervisor 104 acts as an interface between VM $102_1$ and system hardware 110 for executing VM-related instructions and for transferring data to and from machine memory 120, processor(s) 112, disk interface 116, etc. Hypervisor 104 may run on top of an operating system of computer system 100 or directly on hardware components of computer system 100.

In one embodiment, hypervisor 104 includes a page sharing module 124 configured to perform a page sharing process, according to one embodiment, on guest physical memory pages utilized by VM $102_1$. As described in detail later, page sharing module 124 is configured to re-map guest physical memory pages assigned to VM $102_1$ and runtime environments 108 having the same contents to a same machine memory page 122. For clarity of discussion, the term machine memory refers to actual hardware memory that is visible to hypervisor 104. The term guest physical memory refers to a software abstraction used to provide the illusion of hardware memory to a VM. Guest physical memory is generally visible to a guest OS running on a VM. Guest physical memory is backed by machine memory and hypervisor 104 provides a mapping from guest physical memory to machine memory. The term guest virtual memory refers to a continuous virtual address space presented by a guest OS to applications running inside a VM.

VM $102_1$ is configured to support a runtime environment 108 running on top of guest OS 106. Runtime environment 108 supports execution of one or more applications (e.g., application 130) that provide, for example, web services, database services, and other information technology services that may involve retrieval, processing, and serving of data to one or more users. To simplify the description, description of other VMs $102_N$ are omitted but it should be understood that VMs $102_N$ are configured similarly to VM $102_1$. In the embodiments illustrated herein, runtime environment 108 is a Java Virtual Machine (JVM), although it should be recognized that other runtime environments and/or applications executing on top of the guest OS and having their own memory manager, such as databases, web servers, etc., may be used without departing from the scope of the teachings herein. The embodiments presented should therefore not be interpreted to be exclusive or limiting, but rather exemplary or illustrative.

A memory manager 142 of runtime environment 108 handles memory used by and during execution of application 130. Memory manager 142 may allocate memory from a portion of guest physical memory specifically reserved for runtime environment 108, sometimes referred to as heap memory, and embodied in FIG. 1 as heap 134. Heap 134 is configured to store one or more objects (e.g., Java objects) and other data structures utilized during execution of application 130. When heap 134 runs out of space, garbage collector 132 may initiate a garbage collection process wherein dead objects (i.e., objects no longer reachable or used by applications 130) are cleared to create free space and live objects may be compacted. In one approach to garbage collection referred to as "reference counting," garbage collector 132 is configured to record and track the number of references to objects in heap 134. Any objects with a reference count of zero are deemed "unreachable" and may be freed by garbage collector 132 in the next garbage collection. In some embodiments, rather than only wait for heap 134 to be out of space before collecting garbage, memory manager 142 may include a concurrent garbage collector that constantly collects garbage within heap 134. Heap 134 is described in greater detail in conjunction with FIG. 3.

Runtime environment 108 of VM $102_1$ is configured to coordinate with hypervisor 104 to manage memory using a mechanism for balloon memory that performs page sharing procedures on guest physical memory pages utilized by runtime environment 108. According to an embodiment, VM 102₁ includes a balloon driver 126 installed in guest OS 106 and a balloon agent 128 within runtime environment 108. Balloon driver 126 is a systems-level driver configured to communicate with hypervisor 104 and balloon agent 128 to exert memory pressure on runtime environment 108. For example, when balloon driver 126 receives instructions from hypervisor 104 to inflate, balloon driver 126 requests balloon agent 128 to inflate, rather than requesting for memory pages directly from guest OS 106.

Balloon agent 128 is a thread or process executing within runtime environment 108 configured to exert memory pressure on the heap memory of runtime environment 108. Responsive to commands and/or signals provided by hypervisor 104 via balloon driver 126, balloon agent 128 "inflates" a memory balloon by allocating one or more balloon objects 136 within heap memory, thereby effectively reducing the heap space that can be used by runtime environment 108 and any applications 130 running therein. The allocated balloon objects 136 may be given a predetermined value, such as zeroed data, that may be page shared using page sharing module 124. The shared memory pages may be reclaimed by hypervisor 104 and used for other processes, threads, applications, virtual machines, etc. An example technique for implementing balloon memory is further described in more detail in U.S. patent application Ser. No. 12/826,389, filed Jun. 29, 2010, and entitled "Cooperative Memory Resource Management via Application-Level Balloon," which is incorporated herein by reference.

In one embodiment, to inflate the memory balloon, balloon agent 128 allocates one or more new balloon objects 136 within heap memory and adds new balloon objects 136 to a balloon object list 138. To deflate the balloon, balloon agent 128 simply removes some balloon objects 136 from balloon object list 138, and the space may be re-claimed in a future garbage collection process.

When inflating the memory balloon, balloon agent 128 may be configured to allocate a number of balloon objects over a period of time, rather than allocating all of the balloon objects at once. Balloon agent 128 is configured to adjust the allocation rate for new balloon objects 136 based on a determined efficiency of maintaining the memory balloon, with the addition of each balloon object 136, at a minimum cost. As described later, the cost of maintaining the memory balloon includes the allocation cost of creating a new balloon object and then having it garbage collected sometime afterwards. For example, as described later, balloon agent 128 may increase or decrease the allocation rate for balloon objects 136 depending on a calculated life span of old balloon objects that have been reclaimed in a previous garbage collection process.

Balloon object list 138 includes one or more references to balloon objects 136. In one embodiment, balloon agent 128 is configured to set soft-references and/or weak-references in balloon object list 138 to allow for a more flexible memory balloon. As described above, garbage collector 132 may collect any given object (including balloon objects 136) having a reference count of zero to the given object. A variety of reference types may be used for balloon objects 136 in heap 134 to provide various levels of protection from collection. Each reference type having an associated level of strength or "reachability," and garbage collector 132 uses an object's type of reachability to determine when to free the object. The various references types to balloon objects 136 may reflect different priority levels for balloon objects 136.

In some embodiments, a reference to a balloon object 136 may be deemed to have strong, soft, or weak reference strength. A "strong" reference may be counted by garbage collector 132 under a reference counting scheme and generally protects an object from garbage collection. In contrast, "weak" or "soft" references to an object may not be counted by garbage collector 132, and therefore may not protect an object from garbage collection even though the referenced object may still be a live object. In one implementation, "weak" and "soft" references are characterized by different levels of priority to garbage collector 132. For example, garbage collector 132 may free up any weak-referenced objects, while any soft-referenced objects may be freed at the discretion of garbage collector 132 according to memory demands and internal memory policies of garbage collector 132. While embodiments of the present disclosure described herein provide a system having strong, weak, and soft reference types to balloon objects 132, it should be recognized that other schemes for prioritizing references and/or objects and marking objects as available for garbage collection may be utilized. For example, other schemes having two levels of reference strength (e.g., weak and strong) or more than three levels of reference strength (e.g., phantom, weak, soft, strong) may also be utilized.

Heap 134 generally has a static maximum limit, set when runtime environment 108 is launched. If memory manager 142 cannot find free space to allocate a new object, even after a full garbage collection, memory manager 142 issues an Out-of-Memory (OOM) error which typically causes an application abort. Since balloon objects effectively reduce the heap space that can be used by applications, an increase in the balloon size, as well as pre-existing balloon objects, could contribute to an OOM error. As such, to avoid OOM errors, it may be desirable to permit some of balloon objects 136 to "erode" or be sacrificed in response to memory pressure (e.g., from applications 130 running in runtime environment 108) and permit garbage collection to free one or more balloon objects 136 when runtime environment 108 needs space to allocate application objects. Any freed balloon objects may be re-created after garbage collection, using reclaimed heap memory made available by garbage collection after cleaning up dead objects. Accordingly, balloon agent 128 may modify balloon object list 138 to mark a portion of balloon objects 136 in heap 134 as available for garbage collection based on metrics derived from previous full garbage collection processes. For example, as described further later, balloon agent 128 may modify balloon object list 138 to include point to a particular percentage of referenced balloon objects 136 with weak references based on an amount of application data reclaimed in previous garbage collection processes. The "weakness" of the balloon may be inversely proportional to the amount of heap space made available by a previous garbage collection. That is, if a lot of heap space is made available, it may be inferred that the balloon is not overly constraining the heap. If a small amount of heap space is made available, making the balloon relatively weak avoids OOM errors, as well as provides a metric through which the balloon allocation rate may be determined, as described further below.

Balloon agent 128 is further configured to maintain balloon object metadata 140 that track the state of each balloon object 136 within heap 134. Examples of metadata 140 maintained for balloon objects 136 include a size of the balloon object (e.g., 4 MB); a number of times the balloon object has been compacted; whether the balloon object is live or has been freed by garbage collection; if live, which portion within heap memory the balloon object resides (e.g., tenured space); a timestamp of when the balloon object had been allocated; a timestamp of when balloon object had been freed during garbage collection, etc. While FIG. 1 depicts balloon agent 128 and balloon object metadata 140, as being external to heap 134, it should be recognized that balloon agent 128 and balloon object metadata 140 may comprise Java code and Java data structure and may, in fact, reside within heap 134.

Memory Balloon Feedback Loop

Figure 2:
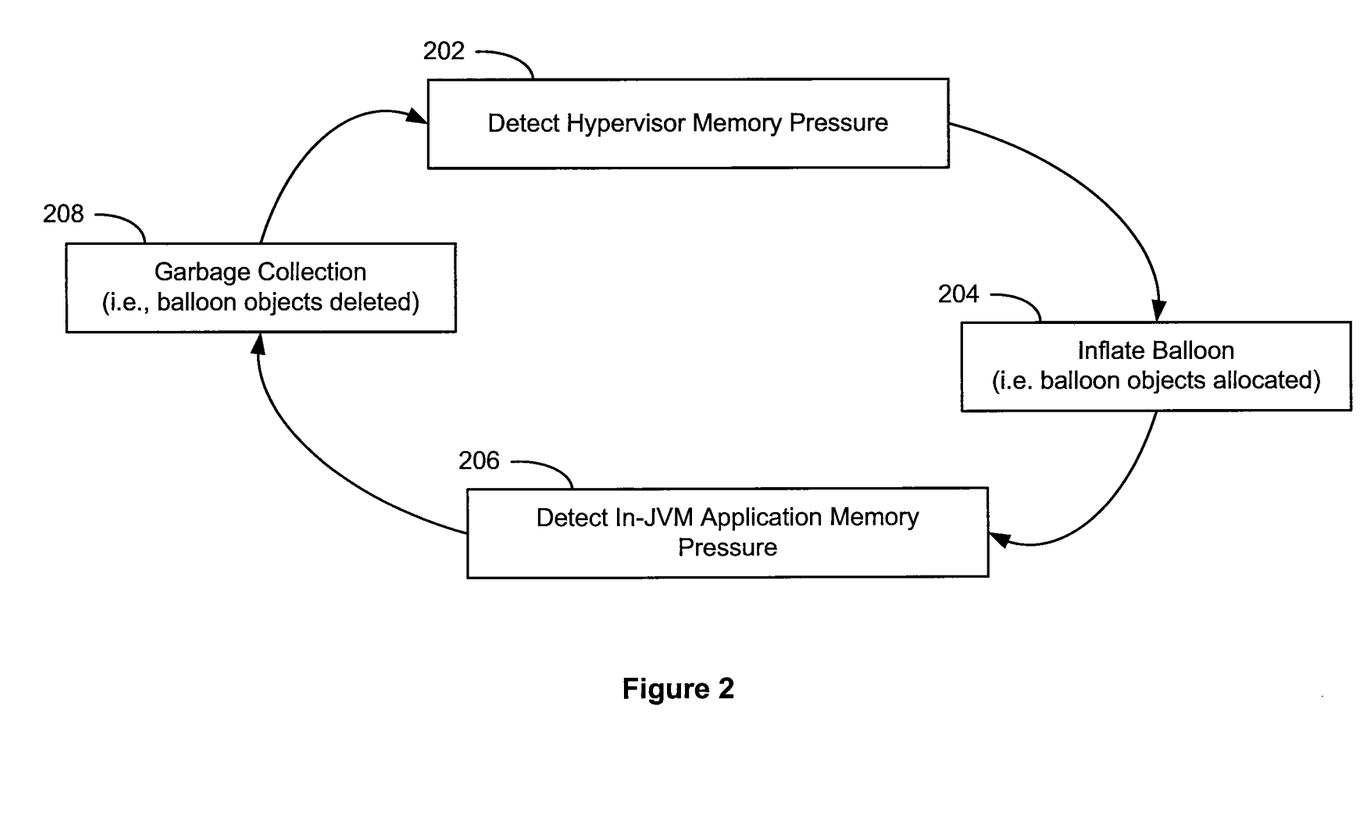
FIG. 2 is a flow diagram that illustrates a feedback loop that may occur while managing memory assigned to a runtime environment.

Memory demands by applications 130 running within runtime environment 108 may present certain issues related to managing memory using a memory balloon technique described above. FIG. 2 illustrates a cycle of events that may occur while managing memory of a runtime environment 108 having an active application 130 executing therein. At 202, balloon agent 128 may detect memory pressure from outside of runtime environment 108, such as from hypervisor 104. Responsive to the memory pressure, at 204, balloon agent 128 initiates an operation to inflate a memory balloon within heap 134 of runtime environment 108. For example, balloon agent 128 may create one or more balloon objects 136 in heap 134, thereby allowing a portion of heap 134 to be page shared (e.g., by page sharing module 124) to satisfy memory pressure from hypervisor 104.

Generally, in-heap memory ballooning and subsequent reclamation occurs in relatively inactive JVMs. For example, in cases where an application 130 is not actively using a significant amount of heap memory during its execution, inflation of a memory balloon within heap 134 is likely to yield a substantial amount of machine memory pages to be repurposed by hypervisor 104. However, in some situations, such as at 206 in FIG. 2, application 130 may be actively using a significant portion of heap memory, thereby exerting application memory pressure within runtime environment 108. During such periods of heavy workload, memory ballooning and reclamation competes with active, live memory used by application 130. That is, the memory profile of application 130 within heap 134 may compete with any balloon objects 136 created to inflate the memory balloon. This combination of active memory used by application 130 and any balloon objects 136 created while inflating the memory balloon may use up all or nearly all of available heap memory 134.

At 208, memory manager 142 detects depletion of available heap memory and initiates a garbage collection process. Garbage collector 132 reclaims JVM heap memory by freeing dead objects and, in some cases, one or more balloon objects that are configured as weak-referenced objects (or soft-referenced objects). Nonetheless, memory pressure external to VM 102$_1$ (e.g., from hypervisor 104) persists, which may cause in-heap balloon to continually re-inflate. As such, a cycle of memory pressure may arise wherein balloon objects 136 are created in heap 134 but are quickly freed by garbage collection without providing any benefit or memory relief. Further, conventional approaches to memory ballooning are insufficient when responding to competing memory demands from an application (e.g., application 130). For example, under traditional guest OS ballooning, if one application is competing for memory with the balloon, the guest OS may simply start paging memory of the application to disk, a costly operation. In the context of JVM ballooning, application data cannot give way to balloon pressure in the same way. As such, previous approaches lacked ways to determine in which circumstances a memory balloon should yield to competing memory pressure, to what degree the memory balloon should yield, and which balloon objects of the memory balloon should be sacrificed to competing memory demands.

Accordingly, embodiments of the present disclosure provide a system for evaluating a relative "value" of balloon objects 136 such that destruction and re-creation of balloon objects 136 of the memory balloon may be managed towards the overall goal of reducing the overall cost of the memory balloon. In one embodiment, balloon agent 128 may adjust, over time, which balloon objects 136 are to be weak-referenced based on the relative value of each balloon object (e.g., keeping high value balloon objects and sacrificing low value balloon objects). Balloon agent 128 may further adjust the number of balloon objects 136 that are to be weak-referenced based on an amount of heap memory estimated that can be re-claimed, as described in conjunction with FIG. 4. Further, balloon agent 128 may throttle the allocation rate for new balloon objects 136 during periods of high memory usage in heap 134 to reduce wasted cost of re-creating balloon objects only to have them destroyed by garbage collection, as described further in conjunction with FIG. 5.

Determining Value of Balloon Objects

Figure 3:
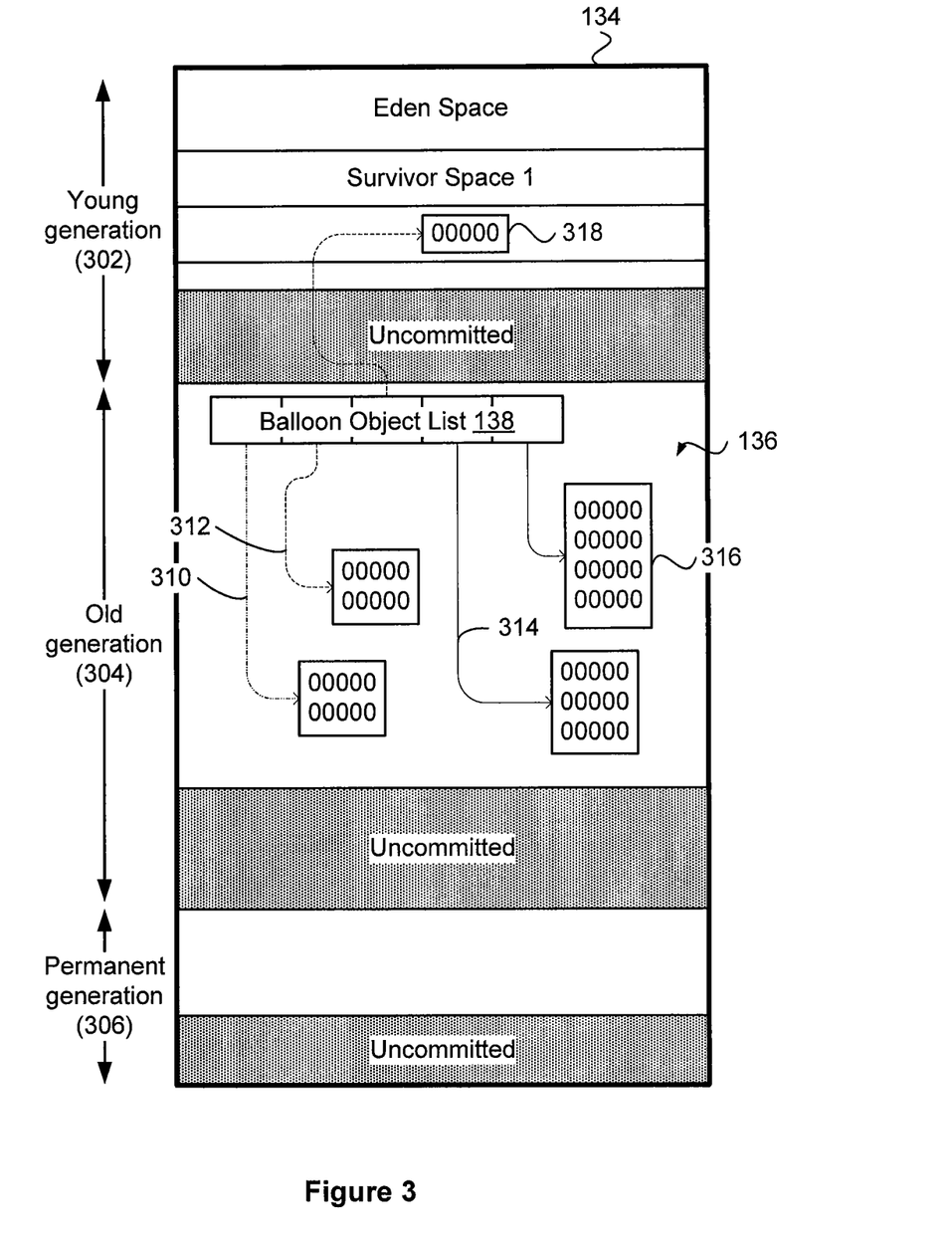
FIG. 3 depicts a layout of a Java memory heap while a memory management technique is performed, according to one or more embodiments.

FIG. 3 depicts a layout of heap 134 having balloon objects 136 residing therein, according to one or more embodiments. While an embodiment based on OpenJDK, an open source JVM implementation from Oracle Corporation, is depicted, principles of the present disclosure can also be used with other JVM implementations.

Heap 134 is divided into regions of young, old, and permanent generations 302, 304, 306, respectively. Permanent generation 306 holds static data, such as class descriptions, and has its own form of memory management. New objects are allocated into an "eden" space of young generation 302. Once the eden space is exhausted, runtime environment 108 may start a minor garbage collection operation, where live objects (i.e., reachable) are copied into a "survivor" space. In the embodiment illustrated herein, there are two survivor spaces, which serve alternately as the destination of live objects from the eden space or from the other survivor space. Objects stay in young generation 302 until the objects (including balloon objects 136) live long enough to be promoted into old generation 304, sometimes referred to as "tenured space." When old generation 304 runs out of space, a major garbage collection happens and live objects may be copied and compacted within old generation heap 304 to create free space.

In one embodiment, balloon object list 138 includes one or more references 310, 312, 314 to balloon objects 136 that encapsulate regions of data for use in memory ballooning. In some embodiments, the data region for each balloon object 136 is configured in a format that balloon agent 128 may determine a page address of an underlying guest physical memory page within heap 134, e.g., via a Java Native Interface (JNI) call. In the embodiment shown in FIG. 3, the region of data for each balloon object 136 is arranged as a byte array having zeroed out data, although other suitable data structures and formats may be utilized. In some embodiments, balloon agent 128 may allocate balloon objects 136 having different sizes, responsive to memory demands (e.g., via hypervisor 104). For example, FIG. 3 depicts a balloon object 316 allocated with a significantly larger size than a balloon object 318.

Balloon agent 128 may convert any references to balloon objects (e.g., references 310, 312, 314) to a different type of reference (e.g., weak, soft, and strong) according to balloon object management techniques described below. As described above, the one or more references to balloon objects 136 may be configured in various levels of object priority. For example, reference 310 is depicted as a dot-dashed directional line to denote a weak reference to an object that may be freed upon the next garbage collection process.

Reference 312 is depicted as a dashed directional line to denote a soft reference to an object that may be taken away at the discretion of garbage collector 132 in subsequent garbage collections and in response to memory demands. Reference 314 is depicted as a solid directional line to denote a strong reference to an object that is protected from garbage collection.

It has been determined that maintaining a memory balloon comprised of balloon objects 136 incurs a particular cost in both time and performance. For example, each balloon object 136 incurs a cost when memory is allocated from available memory in heap 134 and an object is created; when, as balloon objects 136 persist in heap 134, a balloon object is "tenured" and copied from young generation 302 to old generation 304; and when garbage collection results in compaction where balloon objects are moved within old generation space 304 to create contiguous free space in heap 134. Accordingly, embodiments of the present disclosure provide a mechanism by which to evaluate and assign a relative value of importance to each balloon object 136 such that the memory balloon may be maintained at a minimized overall cost. For example, balloon agent 128 may seek to maintain balloon objects whose determined value that far exceeds its maintenance cost, while selecting balloon objects having a lesser value as a possible candidate for sacrifice in response to high memory demands and memory pressure.

In one embodiment, balloon agent 128 may calculate a value for each balloon based a heuristic using balloon object metadata 140. Balloon agent 128 may calculate or re-calculate values of each balloon object 136 in balloon object list 138 on a periodic basis, or alternatively, in response to some event (e.g., garbage collection) or operation.

In some embodiments, a balloon object value may be evaluated based on whether the balloon object is "tenured," or resides within old generation space 304. It has been determined that even if a balloon object within young generation space 302 (e.g., balloon object 318) is page shared, the page sharing link will be lost if the object is shortly copied to survivor space 1, necessitating a repeated hint to hypervisor 104 and page sharing module 124, and when the balloon object is promoted again (e.g., to tenured space), the page sharing link is once again broken, and the page sharing process is repeated yet again. As such, balloon objects residing in tenured space (e.g., balloon object 316) are more able to appreciate benefits of page sharing for a sustained duration, and are assigned a higher relative value than un-tenured balloon objects.

Additionally, the value of a balloon object may be determined according to a number of compactions that the balloon object has endured, for example, as provided by balloon object metadata 140. It has been determined that a higher number of compactions undergone by a particular balloon object may relate to a number of garbage collections that the balloon object has survived. Further, it has been determined that the younger a balloon object is, the more likely the balloon object will get compacted by garbage collection. In some heap configurations, the very long-lived objects tend to accumulate in one part of the tenured area of the heap. Since this area of the heap contains the objects least likely to be garbage collected, it is an area least impacted by compactions. A newly allocated object may eventually work its way towards this area through a series of compactions over time. Therefore, the more compactions an object has experienced, the less likely it is to experience another. Because compaction may cause unpredictable fluctuations in balloon size and carries an additional performance cost (e.g., in terms of having to re-share underlying guest physical memory pages), it was been determined that the longest-lived balloon objects may have the most value. As such, in some embodiments, the value of a balloon object may be increased based on a greater number of compactions experienced (and decreased based on a lesser number of compactions).

Further, the value of a balloon object may be determined according to a size of the balloon object within heap memory. For example, a larger balloon object having zeroed out data is able to page share, and consequently reclaim, a larger portion of heap memory than other balloon objects. As such, in some embodiments, the value of a balloon object may be increased for larger balloon objects and decreased for smaller balloon objects.

Determining Reference Strength of Balloon Objects

After calculating values of balloon objects, balloon agent 128 may identify one or more balloon objects having a lowest value as a possible candidate for sacrifice in response to high memory demands and memory pressure. Balloon agent 128 marks the identified balloon objects as available for garbage collection to reflect the low priority of the identified balloon objects. In some embodiments, balloon agent 128 may convert references to the identified balloon objects having a lowest value to weak references so that the identified balloon objects may be reclaimed in response to memory pressure via a next garbage collection.

However, it has been determined that not all situations would benefit from having balloon objects be weak-referenced and freed at the next garbage collection. For example, in a case where a JVM has been relatively inactive, balloon objects may be strong-referenced because there is less concern for competing memory pressure from applications running in the JVM. Even if tenured space ran out, a full garbage collection process would reclaim enough heap memory from dead objects to have sufficient space to accommodate the balloon objects. In such a situation, more balloon objects should persist (e.g., survive the garbage collection) and avoid incurring costs for needlessly rebuilding new balloon objects. Accordingly, embodiments of the present disclosure provided a technique for determining what proportion of balloon objects should be configured to "self-sacrifice" and be marked as available for garbage collection in the face of competing memory demands and with respect to the balloon target.

Figure 4:
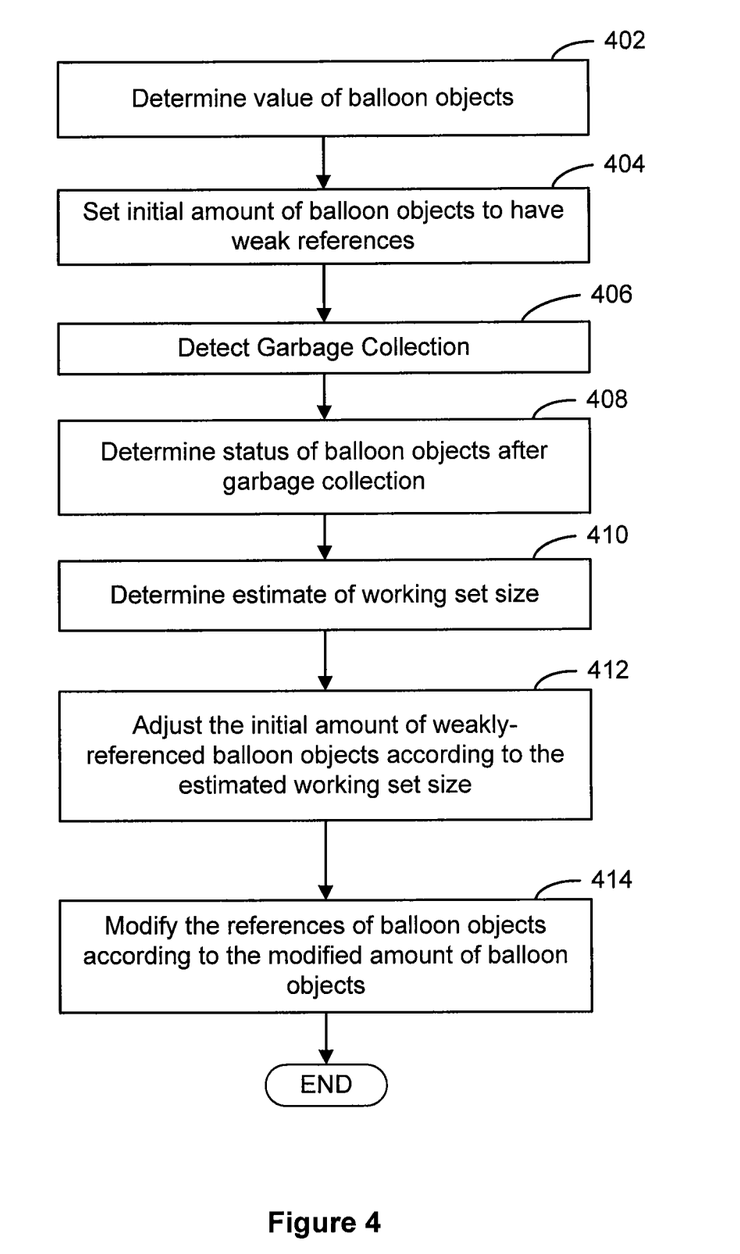
FIG. 4 is a flow diagram that illustrates steps for a method of managing balloon objects within a runtime environment, according to an embodiment of the present invention.

FIG. 4 is a flow diagram that illustrates steps for a method of managing balloon objects within a runtime environment, according to an embodiment of the present invention. It should be recognized that, even though the method is described in conjunction with the system of FIG. 1, any system configured to perform the method steps is within the scope of embodiments of the invention. It should be further recognized that modifying reference strengths of balloon objects is but one of a variety of mechanisms for marking balloon objects as available for garbage collection, and that other suitable mechanisms may be utilized according to the techniques described herein.

In step 402, balloon agent 128 determines a value for each of balloon objects 136, according to the evaluation heuristic described above. In some embodiments, balloon agent 128 may calculate and assign a numerical value corresponding to the relative value of each balloon object 316. In other embodiments, balloon agent 128 may rank and/or sort balloon objects 136 based on their relative value. In some embodiments, the determined value may be stored within balloon object metadata 140.

In step 404, balloon agent 128 sets an initial amount of balloon objects 136 to have weak references. The initial amount of balloon objects 136 represents a target total balloon weakness, or a target amount of the memory balloon to be weak-referenced, and may be determined as a function of balloon object size. For example, balloon agent 128 may convert weak references to a plurality of some amount of balloon objects 136 that together take up at least 200 MB of heap memory. In some embodiments, the initial amount of balloon objects may be pre-determined as percentage of the total heap size. For example, for a JVM having a 2 GB heap size, balloon agent 128 configures balloon object list 138 to have the weak portion of the memory balloon to be equal to 15% of the heap size (or, 300 MB worth of weak-referenced balloon objects).

In step 406, balloon agent 128 detects a garbage collection process. In some embodiments, garbage collector 132 may generate a garbage collection event before each garbage collection, which is received by a garbage collection intercept mechanism. In one implementation, the garbage collection intercept mechanism may use an interface that allows a program to inspect the state, and to control the execution of, applications running in runtime environment 108, for example, such as a Java Virtual Machine Tool Interface (JVMTI). Upon receiving the garbage collection event, garbage collection intercept mechanism notifies balloon agent 128, which accesses the state of runtime environment 108 (e.g., via JVMTI) and records information pertaining to heap 134 prior to garbage collection. For example, balloon agent 128 may record a total amount of memory consumed by heap 134 and a total size of balloon objects 136 already residing with heap 134. Once balloon agent 128 has completed this pre-garbage collection monitoring, garbage collection takes place.

As mentioned above, during the garbage collection process, garbage collector 132 may move (e.g., compact) live objects in tenured space of heap 134, reclaim heap memory by freeing dead objects, free weak referenced objects (such as one or more balloon objects), and, at the discretion of internal memory management algorithms of garbage collector 132, free soft referenced objects.

In step 408, after garbage collection has taken place, balloon agent 128 checks the status of balloon objects post-garbage collection. Balloon agent 128 performs bookkeeping and checks each reference in balloon object list 138 to detect any moved or freed balloon objects 136. Notably, balloon agent 128 may calculate and record a total size of balloon objects freed by garbage collection. In some embodiments, as may be utilized in a technique shown in FIG. 5, balloon agent 128 may record timestamps of any balloon objects freed by garbage collection and store the timestamps within balloon object metadata 140.

In step 410, balloon agent 128 estimates a working set size of heap 134. Generally, the heap size of heap 134 defines the boundary within which memory is allocated and freed (e.g., by memory manager 142). The heap size may grow to a maximum size, often pre-defined by a system administrator. The "committed heap" refers to the amount of heap memory backed by guest physical memory pages from the guest OS. In other words, the committed heap indicates the percentage of the heap size that has been written to. The "used heap" refers to the current size of the live and dead objects in heap 134. The "working set size" is the size of just the live objects within heap 134. Because of the opaque nature of its memory management policies, runtime environment 108 generally does not provide the working set size of heap 134 at any one time. Knowledge of the working set size of heap 134 enables balloon agent 128 to determine how much of the memory balloon to sacrifice rather than fight with live objects for space in heap 134. Generally, it has been determined that when the working set size is high, more of the memory balloon should be configured as weak; while when the working set size is low, balloon pressure may be maintained and not sacrificed.

Accordingly, in one embodiment, balloon agent 128 estimates the working set size of heap 134 by determining an amount of application objects that has been garbage-collected from heap memory. For clarity of discussion, the term application objects generally refers to any object and/or data previously allocated for use by applications 130 running within runtime environment 108 as distinguished from balloon objects 136 used for memory ballooning. In some embodiments, balloon agent 128 may again access the state of runtime environment 108 (e.g., via JVMTI) and record information pertaining to heap 134 after garbage collection has been completed. For example, balloon agent 128 may retrieve and record the used heap size (e.g., total amount of memory being used by heap 134) before and after garbage collection has been performed.

In one embodiment, balloon agent 128 may determine the amount of application objects freed in the previous garbage collection by taking the difference in used heap before and after the last garbage collection and, while accounting for the amount of balloon objects freed during the garbage collection (e.g., as checked in step 408). In other words, balloon agent 128 may calculate the amount of application data freed in the previous garbage collection as (i) the used heap after garbage collection less (ii) the used heap before the garbage collection, (iii) further subtracting the size of balloon objects determined to be garbage collected in the last collection. For example, say, prior to garbage collection a total size of used heap 134 is 2 GB, and after garbage collection, the total used heap size is 1.9 GB, and balloon agent 128 knows that 100 MB of balloon objects were freed, balloon agent 128 may infer that little to no amount of application data had been freed in the last garbage collection, and the totality of freed space had been reclaimed from weak-referenced balloon objects.

In step 412, balloon agent 128 adjusts the initial amount of weak-referenced balloon objects according to the estimated working set size. The estimated working set size enables balloon agent 128 to derive the proportion of live data-to-garbage for the application, and then use this information to make an educated guess as to how much of the balloon to make weak for a next garbage collection process.

In one embodiment, balloon agent 128 adjusts the initial amount of weak-referenced balloon objects according to the determined amount of application data freed in the previous garbage collection. Generally, determining that little to no amount of application objects is being freed during garbage collection is a sign that an application is actively using significant amounts of heap memory. Accordingly, balloon agent 128 may increase the amount of balloon objects that are weak referenced so that memory ballooning does not compete with applications running in runtime environment 108. Conversely, a substantial amount of application objects being freed during garbage collection indicates that an application is relatively inactive, and balloon agent 128, according to a received balloon target size, may decrease the amount of balloon objects that are weak referenced so that more of the balloon objects are likely to persist after garbage collection, and the cost of re-creating balloon objects may be avoided, thereby lowering the overall cost to maintain the memory balloon.

As such, in some embodiments, balloon agent 128 calculates an adjusted amount of balloon objects to have weak references by subtracting the actual amount of application objects freed in the previous garbage collection from the target total balloon weakness (e.g., as determined in step 404). Balloon agent 128 establishes a target maximum amount of the balloon to be weak as a proportion of the heap size and based on the balloon target, and subtracts the application data freed in the last garbage collection from that weakness target value. In one embodiment, balloon agent 128 determines an amount of balloon to be weak by aiming for a certain percentage of the heap to be freed after a garbage collection. If the working set size is high, then that freed memory may largely be comprised of balloon objects; if low, then the freed memory may be largely comprised of application data garbage.

Using the example described earlier, assuming balloon agent 128 determines that 200 MB of application data had been freed in the previous garbage collection, balloon agent 128 adjusts the initial amount of balloon objects (e.g., 300 MB) to now be 100 MB (e.g., 300 MB−200 MB=100 MB) worth of balloon objects to have weak references. Alternatively, in some embodiments, balloon agent 128 calculates an adjusted amount of balloon objects to have weak references as inversely proportional to the amount of application objects freed in previous garbage collections. For example, if fewer and fewer application objects are freed in subsequent garbage collections, balloon agent 128 subsequently increases the amount of balloon objects to have weak references.

In step 414, balloon agent 128 modifies the references of balloon objects 136 according to the adjusted amount of balloon objects. Balloon agent 128 may modify balloon object list 138 to convert to weak references an amount of balloon objects having a total size equal to the adjusted amount determined in step 410. In some embodiments, balloon agent 128 identifies and makes weak references for balloon objects having a lowest value, as determined in step 402, such that those balloon objects having a least importance are freed first by garbage collection. It should be recognized that the remainder of balloon objects (i.e., those balloon objects not weak-referenced) may be strong referenced and/or soft referenced to generally survive garbage collection.

It should be recognized that the steps 406 to 414 may loop during operation of runtime environment 108. When heap memory is once against exhausted, garbage collection may be initiated once again (e.g., as detected in step 406) and the balloon objects of the memory balloon may be adjusted to accommodate memory demands, if any, of running applications.

Accordingly, embodiments of the present disclosure provide a mechanism that actively manages weak references of a memory balloon to sacrifice chosen portions of the memory balloon. Such a mechanism provides several advantages over previous approaches. For example, an approach that relies heavily on soft references may have unpredictable behavior because garbage collection is generally an opaque process and it may be hard to predict when and if a particular soft referenced object will be freed at a particular time. Further, relying entirely on weak-referenced balloon objects may be insufficient for reducing the maintenance cost of the memory balloon, as no balloon objects would persist and any balloon object would have to be recreated after garbage collection.

Determining Balloon Object Allocation Rate

In some cases, though garbage collector 132 frees balloon objects 136 that are weak- and soft-referenced to reclaim heap memory, memory pressure from hypervisor 104 may persist, which causes balloon agent 128 to re-inflate the memory balloon (and rebuild balloon objects). However, as in the cycle described in FIG. 2 above, any rebuilt balloon objects 136 might be quickly freed by garbage collection without providing any benefit or memory relief. As such, embodiments of the present disclosure provide a mechanism to manage a balloon-object allocation rate based on memory pressure from an application running within runtime environment 108.

Figure 5:
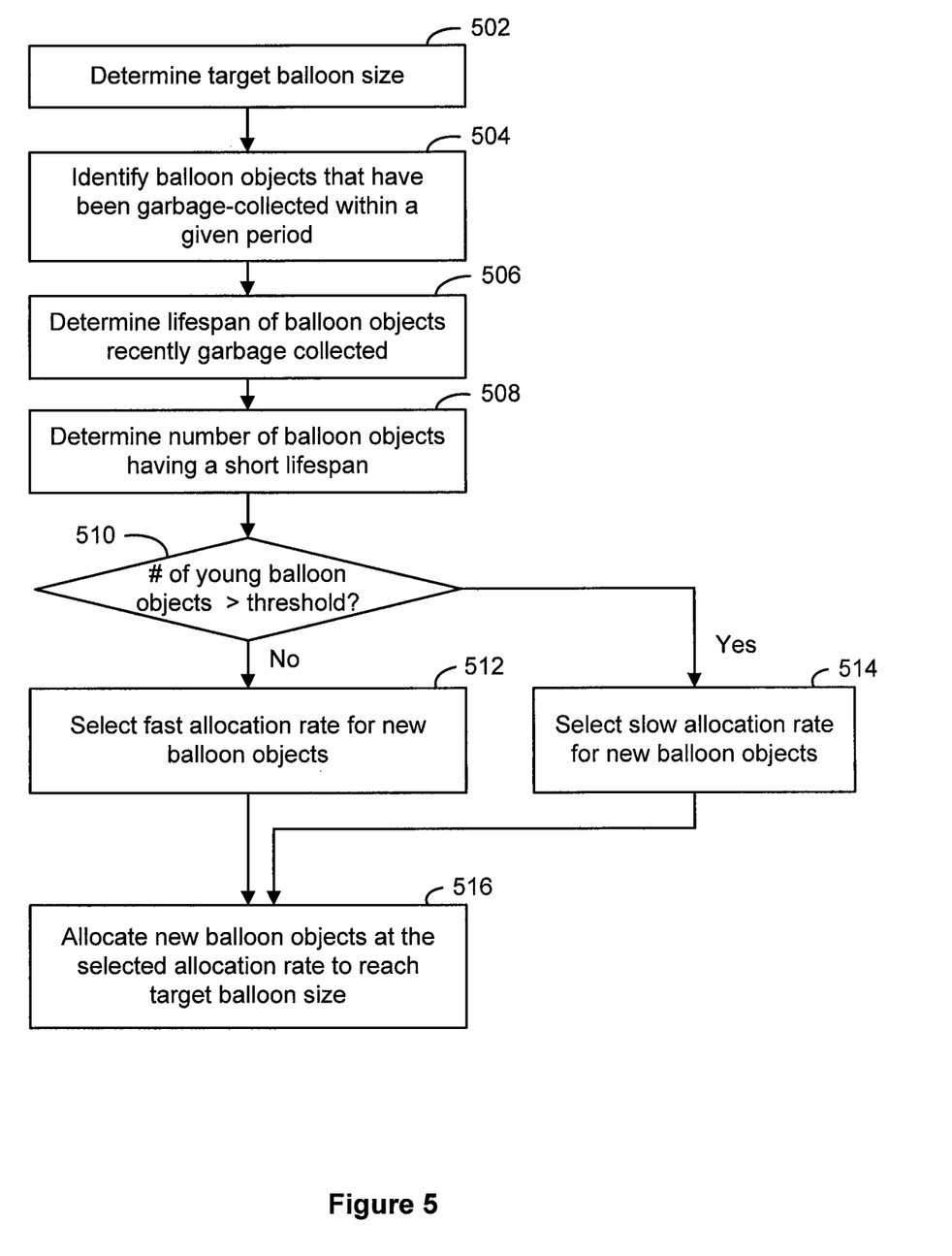
FIG. 5 is a flow diagram that illustrates steps for a method of managing balloon objects within a runtime environment, according to an embodiment of the present invention.

FIG. 5 is a flow diagram that illustrates steps for a method of managing balloon objects within a runtime environment, according to an embodiment of the present invention. It should be recognized that, even though the method is described in conjunction with the system of FIG. 1, any system configured to perform the method steps is within the scope of embodiments of the invention.

In step 502, balloon agent 128 receives a target memory size in conjunction with a request for memory from hypervisor 104. In some embodiments, balloon agent 128 may receive a request to inflate memory balloon to a particular target balloon size. In some embodiments, balloon agent 128 may periodically poll for a new balloon target size from balloon driver 126 and determine whether the new target size for memory balloon is greater than or less than a current size of memory balloon. In another embodiment, the communication between balloon agent 128 and balloon driver 126 within guest OS 106 is through standard POSIX system calls.

In step 504, balloon agent 128 identifies one or more balloon objects that have been recently garbage-collected. In one embodiment, balloon agent 128 uses balloon object list 138 and balloon object metadata 140 to identify recently-collected balloon objects. For example, balloon agent 128 may use a timestamp of object freeing (e.g., provided by balloon object metadata 140) to identify balloon objects (e.g., in balloon object list 138) that were freed in a most recent last garbage collection. In other embodiments, balloon agent 128 may identify balloon objects that were garbage collected over a given period (e.g., the last 60 seconds), or may identify the last-N balloon objects that were garbage collected (e.g., the last 100 balloon objects).

In step 506, balloon agent 128 determines a life span for each of the identified balloon objects. In some embodiments, the life span of a balloon object may be determined as the duration of time from time of allocation of the balloon object to the time the balloon object is garbage collected. In other words, the life span of a balloon object may be calculated as the difference between the timestamp of object allocation and the timestamp of object freeing, as provided by balloon object metadata 140.

In step 508, balloon agent 128 determines how many of identified garbage-collected balloon objects were very young, e.g., have a short life span. In some embodiments, a short life span may be characterized as a life span less than a predetermined period of time (e.g., shorter than 30 seconds). In step 510, balloon agent 128 determines whether the number of balloon objects that died young exceeds a pre-determined threshold value. In some embodiments, the threshold value may be a pre-determined value (e.g., 100 balloon objects), or alternatively, may be dynamically adjusted (e.g., via a hysteresis loop).

In step 512, responsive to determining that the number of young balloon objects does not exceed the threshold value, balloon agent 128 selects a "fast" allocation rate for new balloon objects. In step 514, responsive to determining that the number of young balloon objects does exceed the threshold value, balloon agent 128 selects a "slow" allocation rate for new balloon objects. That is, after it has been determined that balloon objects are not living within heap memory for a sufficient period of time, balloon agent 128 will more slowly rebuild balloon objects 136. In some embodiments, balloon agent 128 sets the slow allocation rate for a pre-determined period of time, upon the expiry of which, the allocation rate reverts to the default "fast" allocation rate.

While steps 512 and 514 illustrate balloon agent 128 selecting one of a plurality of pre-determined allocation rates (e.g., "slow," "normal," "fast"), it should be recognized that other schemes for modifying the allocation rate of balloon objects may be utilized. For example, balloon agent 128 may increase (e.g., at step 512) or decrease (e.g., at step 514) the allocation rate for new balloon objects responsive to whether the life span of the lowest valued balloon object exceeds the threshold value. In some embodiments, balloon agent 128 may modify the allocation rate for balloon objects in a step-wise fashion, where the allocation rate is increased or decreased by a predetermined incremental value. In other embodiments, balloon agent 128 may modify the allocation for balloon objects in a dynamic manner, such as with an exponential increase or decrease.

In step 516, balloon agent 128 rebuilds the memory balloon by allocating balloon objects at the selected allocation rate to reach the target balloon size. As described above, the allocated balloon objects 136 may be given a predetermined value, such as zeroed data, that may be page shared using page sharing module 124. Balloon agent 128 notifies, or "hints," to hypervisor 104 that guest physical memory pages backing balloon objects 136 as candidates for page sharing. In one implementation, balloon driver 126 may communicate with hypervisor 104 via a backdoor call and provides a page sharing hint comprising an address of a candidate guest physical memory page (e.g., a guest physical page number.) For example, page sharing module 124 may map the hinted guest physical memory page with a matched guest physical memory page to a same machine memory page 122. Page sharing module 220 may modify one or more internal references in a page table to associate the hinted guest physical memory page with the matched memory page such that only one copy of the memory page needs be retained within machine memory 120. That is, only one copy of the data region within heap memory needs to be retained within machine memory 120. It is noted that if a later access attempts to modify shared machine memory page 122 (e.g., compaction of balloon object 136) hypervisor 104 immediately makes a copy of the shared memory as per a copy-on-write (COW) technique. Hypervisor 104 reclaims a machine memory page 122 previously utilized by the hinted guest physical memory page assigned to runtime environment 108 and makes the de-allocated machine memory page available to other processes executing on host computer system 100, such as other VMs and/or other runtime environments 108.

It should be recognized that other suitable techniques may be utilized for determining the balloon object allocation rate based on the life span of previously garbage-collected balloon objects. For example, the allocation rate may be determined based on the life span of a particular representative balloon object (e.g., a life span of the balloon object having a lowest relative value of importance). In another example, the allocation rate may be determined based on an aggregated life span calculated from previously garbage-collected balloon objects (e.g., an average life span of the last 100 garbage-collected balloon objects). In yet another example, the allocation rate may be determined based an aggregated life span calculated from a statistical sampling of previously garbage-collected balloon objects (e.g., a median life span of every Nth garbage-collected balloon object).

Accordingly, embodiments of the present disclosure provide a mechanism that balances hypervisor memory pressure (e.g., via a memory balloon) and application memory pressure that may compete for use of heap memory. Table 1 below depicts a matrix that summarizes how the disclosed mechanism manages the memory balloon, and its balloon objects, under different scenarios of competing memory pressure.

TABLE 1

Memory Scenarios

| | | Hypervisor/Memory Balloon Pressure | |
| --- | --- | --- | --- |
| | | HIGH | LOW |
| Application Memory Pressure | HIGH | Balloon allocation rate is relative to loss of young balloon objects Medium percentage of memory balloon is weak-referenced Frequent GCs | No or little balloon allocation High percentage of memory balloon is weak-referenced Initially, frequent GC, but fewer GCs later on |
| | LOW | Fast balloon allocation rate Little to none of memory balloon will be weak-referenced Medium level of GCs | No balloon allocation Zero % of balloon will be weak-referenced Infrequent GCs |

In a situation of low hypervisor memory pressure and low application memory pressure, for example, when a JVM is relatively inactive, the mechanism provides little to no new balloon object allocation, zero balloon objects are weak-referenced, and garbage collections (GCs), if any, are infrequent.

In a situation of low hypervisor memory pressure and high application memory use, there are again little to no new balloon objects allocated for the memory balloon. A high percentage of any existing balloon objects in heap 134 become weak-referenced to quickly sacrifice the existing balloon objects to light of the high memory pressure from the application. Initially, there are frequent garbage collections as balloon objects are freed by garbage collected, but then become infrequent after the memory balloon has been completely garbage collected away.

In a situation of high hypervisor memory pressure and low pressure from an application, balloon agent 128 provides a fast allocation rate for balloon objects to promptly inflate the memory balloon. Garbage collections occur at a medium level of frequency due to the size of the heap being effectively restricted by balloon objects 136 residing therein. Further, balloon agent 128 configures little to none of the memory balloon to be weak-referenced because the memory pressure from hypervisor 104 is strong and it may be less efficient (e.g., in view of maintenance cost) to have portions of the memory balloon to erode if there is low competing memory pressure from an application.

In a situation of high hypervisor memory pressure and high memory pressure from an application, balloon agent 128 configures a balloon allocation rate that is relative to the rate of loss of young balloon objects, as described above in FIG. 5. Balloon agent 128 further configures a relatively medium percentage of the memory balloon to be weak-referenced due to the high memory demands from the application, and there may be frequent garbage collection as both the application and balloon objects use up available heap memory. It should be recognized that, over time, execution of runtime environment 108, application 130 running therein, and balloon agent 128 may shift between the various different scenarios of memory usage shown in Table 1. As described, embodiments of the present disclosure provide a mechanism to set an allocation rate for new balloon objects when inflating memory balloon and how much of the inflated memory balloon to be set as weak-referenced, in response to various levels of hypervisor and application memory pressure.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, runtime environment 108 may generally utilize guest virtual memory pages rather than guest physical memory pages and the backdoor call mechanisms (e.g., hypervisor-aware drivers within guest OS 106, etc.) utilized by runtime environment 108 to communicate with hypervisor 104 that may translate guest virtual memory page references received from runtime environment 108 to guest physical memory page references prior to providing them to hypervisor 104. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a runtime environment executing in a virtual machine, the method comprising:
   allocating a plurality of balloon objects within heap memory managed by a runtime environment in response to a request for memory;
   detecting a garbage collection process;
   determining an amount of heap memory freed by the garbage collection process and previously occupied by unused application objects for at least one application executing in the runtime environment; and
   marking a portion of the plurality of balloon objects as available for garbage collection according to the determined amount of heap memory freed by the garbage collection process and previously occupied by the unused application objects;
   during a next garbage collection process, freeing one or more of the balloon objects that are marked.

2. The method of claim 1, wherein said marking the portion of the plurality of balloon objects comprises:
   determining an initial amount of heap memory occupied by balloon objects marked as available for garbage collection; and
   determining an adjusted amount of heap memory occupied by the balloon objects marked as available for garbage collection as the initial amount less the determined amount of heap memory freed by garbage collection and previously occupied by the unused application objects.

3. The method of claim 1, wherein the size of the portion of balloon objects marked as available for garbage collection is inversely proportional to the determined amount of heap memory freed by the garbage collection process and previously occupied by the unused application objects.

4. The method of claim 1, wherein said determining the amount of heap memory freed by the garbage collection process and previously occupied by unused application objects comprises:
   determining a change in size of balloon objects from prior to and after the garbage collection process has been completed;
   determining a change in size of used heap memory from prior to the garbage collection process to after the garbage collection process has completed; and
   determining the amount of the unused application objects freed by garbage collection as the change in used heap size less the change in size of balloon objects.

5. The method of claim 1, wherein said marking the portion of the plurality of balloon objects as available for garbage collection comprises:

determining a relative value of importance for each of the plurality of balloon objects;
identifying one or more of the plurality of balloon objects having a lowest relative value of importance; and
modifying the identified balloon objects having the lowest relative value of importance to have reference strength indicating a low priority in heap memory.

6. The method of claim 5, wherein said determining the relative value of importance comprises:
determining the relative value of each balloon object based on at least one of whether the balloon object resides in a tenured portion of the heap memory, a number of garbage collections survived by the balloon object, and a size of the balloon object within the heap memory.

7. The method of claim 1, further comprising:
identifying a plurality of freed balloon objects that were freed in a previous garbage collection process; and
responsive to a subsequent request for memory, allocating a plurality of new balloon objects in the heap memory at a rate of allocation based on a number of the freed balloon objects that resided in heap memory less than a threshold duration of time.

8. A method for managing memory of a runtime environment executing in a virtual machine, the method comprising:
detecting a garbage collection process configured to free objects residing within the heap memory;
receiving a target memory reclamation size in conjunction with a request for memory;
identifying a plurality of balloon objects that were freed in the detected garbage collection process;
determining an allocation rate for new balloon objects based on life spans of the identified balloon objects within the heap memory; and
allocating a plurality of new balloon objects at the determined allocation rate up to the target memory reclamation size.

9. The method of claim 8, further comprising:
calculating the life span of each of the identified balloon objects within the heap memory as a timestamp recorded during allocation of a balloon object less a timestamp recorded during garbage collection of the balloon object; and
determining a number of the identified balloon objects having a life span shorter than a threshold duration of time.

10. The method of claim 8, wherein the allocation rate of the new balloon objects is based on whether the number of balloon objects having a life span shorter than a threshold duration of time exceeds a threshold count of balloon objects.

11. The method of claim 10, wherein the allocation rate is higher if the determined number of balloon objects does not exceed the threshold count than otherwise.

12. The method of claim 10, wherein the allocation rate is lower if the determined number of balloon objects exceeds the threshold count than otherwise.

13. A non-transitory computer-readable storage medium comprising instructions that, when executed in a computing device, manage memory of a runtime environment executing in a virtual machine by performing the steps of:
allocating a plurality of balloon objects within heap memory managed by a runtime environment in response to a request for memory;
detecting a garbage collection process;
determining an amount of heap memory freed by the garbage collection process and previously occupied by unused application objects for at least one application executing in the runtime environment; and
marking a portion of the plurality of balloon objects as available for garbage collection according to the determined amount of heap memory freed by the garbage collection process and previously occupied by the unused application objects;
during a next garbage collection process, freeing one or more of the balloon objects that are marked.

14. The non-transitory computer-readable storage medium of claim 13, wherein the instructions for marking the portion of the plurality of balloon objects further comprises instructions for:
determining an initial amount of heap memory occupied by balloon objects marked as available for garbage collection; and
determining an adjusted amount of heap memory occupied by the balloon objects marked as available for garbage collection as the initial amount less the determined amount of heap memory freed by garbage collection and previously occupied by the unused application objects.

15. The non-transitory computer-readable storage medium of claim 13, wherein the size of the portion of balloon objects marked as available for garbage collection is inversely proportional to the determined amount of heap memory freed by the garbage collection process and previously occupied by the unused application objects.

16. The non-transitory computer-readable storage medium of claim 13, wherein the instructions for determining the amount of heap memory freed by the garbage collection process and previously occupied by unused application objects further comprises instructions for:
determining a change in size of balloon objects from prior to and after the garbage collection process has been completed;
determining a change in size of used heap memory from prior to the garbage collection process to after the garbage collection process has completed; and
determining the amount of the unused application objects freed by garbage collection as the change in used heap size less the change in size of balloon objects.

17. The non-transitory computer-readable storage medium of claim 13, wherein the instructions for marking the portion of the plurality of balloon objects as available for garbage collection further comprises instructions for:
determining a relative value of importance for each of the plurality of balloon objects;
identifying one or more of the plurality of balloon objects having a lowest relative value of importance; and
modifying the identified balloon objects having the lowest relative value of importance to have reference strength indicating a low priority in heap memory.

18. The non-transitory computer-readable storage medium of claim 17, wherein the instructions for determining the relative value of importance further comprises instructions for:
determining the relative value of each balloon object based on at least one of whether the balloon object resides in a tenured portion of the heap memory, a number of garbage collections survived by the balloon object, and a size of the balloon object within the heap memory.

19. The non-transitory computer-readable storage medium of claim 13, further comprises instructions for:
identifying a plurality of freed balloon objects that were freed in a previous garbage collection process; and
responsive to a subsequent request for memory, allocating a plurality of new balloon objects in the heap memory at a rate of allocation based on a number of the freed balloon objects that resided in heap memory less than a threshold duration of time.

20. A non-transitory computer-readable storage medium comprising instructions that, when executed in a computing device, manage memory of a runtime environment executing in a virtual machine by performing the steps of:

detecting a garbage collection process configured to free objects residing within the heap memory;

receiving a target memory reclamation size in conjunction with a request for memory;

identifying a plurality of balloon objects that were freed in the detected garbage collection process;

determining an allocation rate for new balloon objects based on life spans of the identified balloon objects within the heap memory; and     allocating a plurality of new balloon objects at the determined allocation rate up to the target memory reclamation size.

21. The non-transitory computer-readable storage medium of claim 20, further comprises instructions for:

calculating the life span of each of the identified balloon objects within the heap memory as a timestamp recorded during allocation of a balloon object less a timestamp recorded during garbage collection of the balloon object; and     determining a number of the identified balloon objects having a life span shorter than a threshold duration of time.

22. The non-transitory computer-readable storage medium of claim 20, wherein the allocation rate of the new balloon objects is based on whether the number of balloon objects having a life span shorter than a threshold duration of time exceeds a threshold count of balloon objects.

23. The non-transitory computer-readable storage medium of claim 22, wherein the allocation rate is higher if the determined number of balloon objects does not exceed the threshold count than otherwise.

24. The non-transitory computer-readable storage medium of claim 22, wherein the allocation rate is lower if the determined number of balloon objects exceeds the threshold count than otherwise.

* * * * *